(12) United States Patent
Tsukada (10) Patent No.: US 8,693,773 B2
(45) Date of Patent: Apr. 8, 2014

(54) COLOR IMAGE PROCESSING METHOD, COLOR IMAGE PROCESSING DEVICE, AND RECORDING MEDIUM

(75) Inventor: Masato Tsukada, Tokyo (JP)

(73) Assignee: NEC Corporation, Tokyo (JP)

( * ) Notice: Subject to any disclaimer, the term of this patent is extended or adjusted under 35 U.S.C. 154(b) by 440 days.

(21) Appl. No.: 13/143,395

(22) PCT Filed: Jan. 27, 2010

(86) PCT No.: PCT/JP2010/000460
§ 371 (c)(1),
(2), (4) Date: Jul. 6, 2011

(87) PCT Pub. No.: WO2010/087164
PCT Pub. Date: Aug. 5, 2010

(65) Prior Publication Data
US 2011/0268350 A1 Nov. 3, 2011

(30) Foreign Application Priority Data
Jan. 29, 2009 (JP) .................................. 2009-017940

(51) Int. Cl.
*G06K 9/00* (2006.01)
(52) U.S. Cl.
USPC ............ 382/167; 382/154; 382/254; 382/274
(58) Field of Classification Search
USPC ................................ 382/167, 154, 254, 274; 348/223.1–225.1, 602–603
See application file for complete search history.

(56) References Cited

U.S. PATENT DOCUMENTS

| | | | |
|---|---|---|---|
| 7,002,623 B1 * | 2/2006 | Ohyama et al. | 348/225.1 |
| 7,688,363 B2 * | 3/2010 | Sato et al. | 348/240.2 |
| 8,457,389 B2 * | 6/2013 | Ishiyama | 382/154 |
| 8,538,144 B2 * | 9/2013 | Benitez et al. | 382/167 |
| 2010/0290697 A1 * | 11/2010 | Benitez et al. | 382/154 |
| 2011/0274351 A1 * | 11/2011 | Tsukada | 382/167 |

FOREIGN PATENT DOCUMENTS

| | | |
|---|---|---|
| CN | 101146233 A | 3/2008 |
| EP | 1906674 A1 | 4/2008 |
| JP | 6-187443 A | 7/1994 |
| JP | 10-229499 A | 8/1998 |

(Continued)

OTHER PUBLICATIONS

European search report for EP10735636.2 dated Dec. 21, 2012.

(Continued)

*Primary Examiner* — Ishrat I Sherali
(74) *Attorney, Agent, or Firm* — Sughrue Mion, PLLC (57) ABSTRACT

To provide a color image processing method and device capable of improving the texture of a specific object in a color image taken by a color imaging device by controlling the quantity of a specular component in the specific object. A color image processing device (100) includes an image information acquisition unit (110) that detects an object area based on an input image, and obtains color information and 3D information of the object area, a reflection information restoration unit (120) that restores a specular component and a body reflection component containing shade of the object area based on the color information and the 3D information, a specular component correction unit (130) that corrects the specular component, and a reproduced-color calculation unit (140) that calculates a reproduced color of the object area by using the shade in the body reflection component and the corrected specular component and generates an output image.

9 Claims, 7 Drawing Sheets

(56) References Cited

FOREIGN PATENT DOCUMENTS

| | | |
|---|---|---|
| JP | 2000009537 A | 1/2000 |
| JP | 2001052144 A | 2/2001 |
| JP | 2001092956 A | 4/2001 |
| JP | 3264273 B | 3/2002 |
| JP | 2003317084 A | 11/2003 |
| JP | 2004021388 A | 1/2004 |
| JP | 2004045189 A | 2/2004 |
| JP | 2006023921 A | 1/2006 |
| JP | 2006146342 A | 6/2006 |
| JP | 2006277748 A | 10/2006 |

OTHER PUBLICATIONS

International Search Report for PCT/JP2010/000460 mailed Feb. 23, 2010.

T. Hosoi et al., "Face detection based on Generalized LVQ", FIT2002, I-30, 2002.

J. Tajima, "Image engineering series 10, Color image reproduction theory, Fundamentals of color Management", MARUZEN Co., Ltd. Sep. 30, 1996, pp. 33-39.

R. Ishiyama, "Recognition of Non-Frontal Facial Images by Pose Conversion using Generic 3D Face Model", IEICE, General Conference 2007, D-12-085, 2007, p. 201.

R. Basri et al., "Lambertian Reflectance and Linear Subspaces", Weizmann Institute of Science, Technical Report MCS00-21, NEC Research Institute Technical Report 2000-172R, 2000, pp. 1-27.

R. Ramamoorthi et al., "An efficient representation for irradiance environment maps", [online], Proc. ACM SIGGRAPH 01, 2001, the Internet <URL: http://www1.cs.columbia.edu/~ravir/papers/envmap/envmap.pdf>.

R. Ramamoorthi et al., "On the relationship between radiance and irradiance: determining the illumination from images of a convex Lambertian object", J. Opt. Soc. Am. A/vol. 18, No. 10, Oct. 2001.

Chinese Office Action for CN201080006119.X issued on Jan. 25, 2013 with English Translation.

\* cited by examiner

COLOR IMAGE PROCESSING METHOD, COLOR IMAGE PROCESSING DEVICE, AND RECORDING MEDIUM

This application is the National Phase of PCT/JP2010/000460, filed Jan. 27, 2010, which is based upon and claims the benefit of priority from Japanese patent application No. 2009-017940, filed on Jan. 29, 2009, the disclosure of which is incorporated herein in its entirety by reference.

TECHNICAL FIELD

The present invention relates to image processing of a color image, in particular a color image processing method to realize desired color reproduction of an object in a color image that is actually taken by a color imaging device and thereby to improve the texture, a color image processing device, and a color image processing program.

BACKGROUND ART

As a technique to improve the image quality of a color image taken by a color imaging device, a technique to make the color of a specific object (such as flesh color, green of plants, and a blue sky) in a color image closer to the recorded color of that object and thereby to reproduce a desirable color has been proposed.

For example, Patent literature 1 discloses a technique relating to a color correction of a color image. In Patent literature 1, a representative color is extracted from an object area in an image and RGB correction parameters are determined by comparing that representative color with a predefined center color for correction. Then, each pixel is corrected by controlling the strength at which these correction parameters are applied according to the distance from the center color. Specifically, a technique to intensively correct the color of an object by converting the color information, i.e., the RGB values of each pixel in the color image into a hue, a saturation, and a lightness, calculating a distance between that color and the center color for correction in the color space, and adjusting the correction strength according to that distance has been proposed.

In this technique, a color correction is performed based on the addition/subtraction of correction parameters in the RGB color space. For example, in the case of flesh color of a human face, the ROB correction amount is calculated for each pixel according to the distance from the center color for correction. If the face area is to be lightened in whole, a correction parameter is added to or subtracted from the RGB values of each pixel located in substantially the entire face area according to the above-mentioned distance from the center color for correction. Further, Patent literature 2 discloses a technique relating to the detection of a face area in an input image.

Patent literature 3 discloses a color correction device and method in which when a color correction is made to spectral-color image data, the spectral color is converted into a color space having dimensions lower than the original dimensions; a color correction is made in the lower-dimensional color space; and a spectral color in appropriate dimensions is generated from the lower dimensions.

Further, Patent literature 4 discloses a technique to convert an original color space into a target color space between color systems having different reference white colors, while maintaining the way in which colors are viewed unchanged from that in the original color space. Specifically, the spectral power distribution characteristic of the original reference white is restored from the color temperature of the original reference white, i.e., the reference white of the original color space. Further, the spectral power distribution characteristic of the target reference white is restored from the color temperature of the target reference white, i.e., the reference white of the target color space. Then, the surface reflectance of a given color in the original color space is restored by using the tristimulus values of the given color, the spectral power distribution characteristic of the original reference white, and the color matching functions of human beings. Further, tristimulus values, which are a color in the target color space, are obtained based on the restored surface reflectance, the restored spectral power distribution characteristic of the target reference white, and the color matching functions of human beings.

Patent literature 5 discloses a technique to automatically make an excellent white correction for an important object in a natural image that is taken under various lighting environments. Specifically, the body surface color of a specific object is extracted, and optimal color correction parameters are set for the extracted body surface color. In this way, it is possible to automatically make a color correction for an important object in a natural image taken under various lighting environments. Note that the inventions disclosed in Patent literatures 3, 4 and 5 have completely different configurations from that of the present invention described below.

Patent literature 6 proposes to apply a modeling technique for the skin reflection of a human being to the rendering of a face image. In this method, a 3D (three-dimensional) shape of a face is obtained by scanning the face by a 3D scanner. Then, a plurality of face images are obtained by illuminating the face from different viewpoints in different directions. A total reflectance and a normal vector map are estimated by using the surface scan data and the image data. Then, a transmittancy map is obtained by scanning the under-surface reflectance using a fiber-optic spectrometer. The total reflectance is separated into two components of an under-surface scattering and a (specular) surface reflectance.

Patent-literature 7 proposes an image processing device in which a pixel value of each pixel constituting an image is separated into a specular light component by surface reflection on a 3D (three-dimensional) object and a diffuse reflection light component by diffuse reflection, and at least one of the specular light component and the diffuse reflection light component is modified. In this technique, a reflection model by Klinker et al. as separated into a specular light component and a diffuse reflection light component, and each component is modified by using Phong illumination model, Lambertian Reflection model, or the like without restoring the 3D shape of the object.

CITATION LIST

Patent Literature

Patent literature 1: Japanese Patent No. 3264273 (paragraphs 0036 to 0045)
Patent literature 2: Japanese Unexamined Patent Application Publication No. 2003-317084 (paragraphs 0019 to 0021)
Patent literature 3: Japanese Unexamined Patent Application Publication No. 2004-45189
Patent literature 4: Japanese Unexamined Patent Application Publication No. 10-229499
Patent literature 5: Japanese Unexamined Patent Application Publication No. 2001-92956
Patent literature 6: Japanese Unexamined Patent Application Publication No. 2006-277748

Patent literature 7: Japanese Unexamined Patent Application Publication No. 2001-052144

Non Patent Literature

Non-patent literature 1: "Face detection based on Generalized LVQ" Toshinori Hosoi, Tetsuaki Suzuki, Atushi Satoh, FIT2002, 1-30 (Sep. 2002)
Non-patent literature 2: "Image engineering series 10, Color image reproduction theory, Fundamentals of color management" Joji Tajima, MARUZEN Co., Ltd. Sep. 30, 1996, p. 33-39

SUMMARY OF INVENTION

Technical Problem

The disclosures of the above-mentioned Patent literatures 1 and 2, and Non-patent literatures 1 and 2 are incorporated herein by reference. The analysis of the related art in accordance with the present invention is described hereinafter.

In the color image processing technique in which the three properties of a color such as RGB and/or a hue, a saturation, and a lightness are used for an object area in a color image as in the case of Patent literature 1, there is a problem that the original texture of an object could deteriorate.

This is because in Patent literature 1, color corrections such as making a color lighter, increasing a saturation, and changing a hue are performed while handling the color of a certain object area in an image as a whole. When the color of a certain object in an image is corrected so as to make the image lighter, these color corrections cause such a phenomenon that a color component originally having a high pixel value (e.g., red) is saturated while a correction parameter is added to or subtracted from other color components (green and blue). If this process is carried out for the entire area of an object, the dispersion of the color information or the pixel values in the object area become narrower, and thus deteriorating the apparent texture in the object area.

In Patent literature 6, although the human skin reflection modeling is proposed for the rendering of a face image, it requires a special measurement device, i.e., fiber-optic spectrometer. Therefore, it is very difficult to apply this technique to color corrections for ordinary color image processing.

Patent literature 7 proposes a method of changing the color of a (3D) object in a 2D (two-dimensional) image. However, 3D information of the object in the image is not restored. Instead, a model relating to lighting and/or reflection such as a reflection model by Klinker et al., Phong illumination model, Lambertian Reflection model is applied to realize the color change method. This method is effective when the object matches excellently with a supposed reflection model as in the case of plastic, paint, paper, pottery, and the like. However, when the object has complex reflection characteristics as in the case of human skins, the method suffers from a problem that artifacts occur and so on. Further, in this technique, it does not show any method for correcting an object in an input image to desirable image quality.

As described above, the techniques in the related art achieve a high-quality image by changing the color of an object in a color image to a more desirable color. These techniques have a problem that the texture deteriorates. Accordingly, it is desirable to develop color image processing that can be realized by an easier technique using only an input image and is capable of suppressing the deterioration of the texture in an object area in a color image.

An object of the present invention is to provide a color image processing method, a color image processing device, and a color image processing program capable of improving the texture of an object in a color image and thereby improving the image quality of the color image by focusing attention on a specular component (highlight component) in the object in the color image and adjusting the quantity of this specular component to a desired quantity.

Solution to Problem

An aspect of a color image processing method according to the present invention is a color image processing method including: detecting an object area based on an input image; obtaining color information and 3D information of the object area; restoring a specular component and a shade contained in a body reflection component (or diffuse component) of the object area based on the color information and the 3D information; correcting the specular component; and calculating a reproduced color of the object area by using the shade in the body reflection component and the corrected specular component, and thereby generating an output image.

Further, an aspect of a color image processing device according to the present invention is a color image processing device including: an image information acquisition unit that detects an object area based on an input image, and obtains color information and 3D information of the object area; a reflection information restoration unit that restores a specular component and a shade contained in a body reflection component of the object area based on the color information and the 3D information; a specular component correction unit that corrects the specular component; and a reproduced-color calculation unit that calculates a reproduced color of the object area by using the shade in the body reflection component and the corrected specular component, and thereby generates an output image.

Further, an aspect of a computer-readable recording medium storing a color image processing program according to the present invention is a computer-readable recording medium storing a color image processing program that causes a computer to execute: an image information acquisition procedure for detecting an object area based on an input image, and obtaining color information and 3D information of the object area; a reflection information restoration procedure for restoring a specular component and a shade contained in a body reflection component of the object area based on the color information and the 3D information; a specular component correction procedure for correcting the specular component; and a reproduced-color calculation procedure for calculating a reproduced color of the object area by using the shade in the body reflection component and the corrected specular component, and thereby generating an output image.

Advantageous Effects of Invention

According to the present invention, it is possible to realize desired color reproduction of a certain object in a color image taken by a color imaging device and thereby to maintain or improve the texture.

DESCRIPTION OF EMBODIMENTS

Exemplary embodiments of the present invention are explained hereinafter with reference to the drawings. For clarifying the explanation, the following descriptions and drawings are partially omitted and simplified as appropriate. Components and equivalent parts having the same configuration or function are denoted by the same symbols throughout the drawings, and their duplicated explanation is omitted.

An aspect of an exemplary embodiment according to the present invention is explained. In the present invention, when the texture of a specific object in an input image is to be improved, a 3D (three-dimensional) shape (also referred to as "3D information") of the specific object and geometrical conditions (also referred to as "geometrical information") of the lighting at the time of the image-taking are restored from the input image. Next, a specular component (highlight) and a shade contained in a body reflection component occurring on the specific object are calculated from the restored 3D shape. Then, the calculated quantity of the specular component of that specific object is corrected to a desired quantity, and a reproduced color of the specific object is calculated by using the corrected specular component and the shade contained in the body reflection component. In this way, the corrected apparent texture of the specific object appears more naturally, and the specific object is represented by a more desirable texture.

Figure 1:
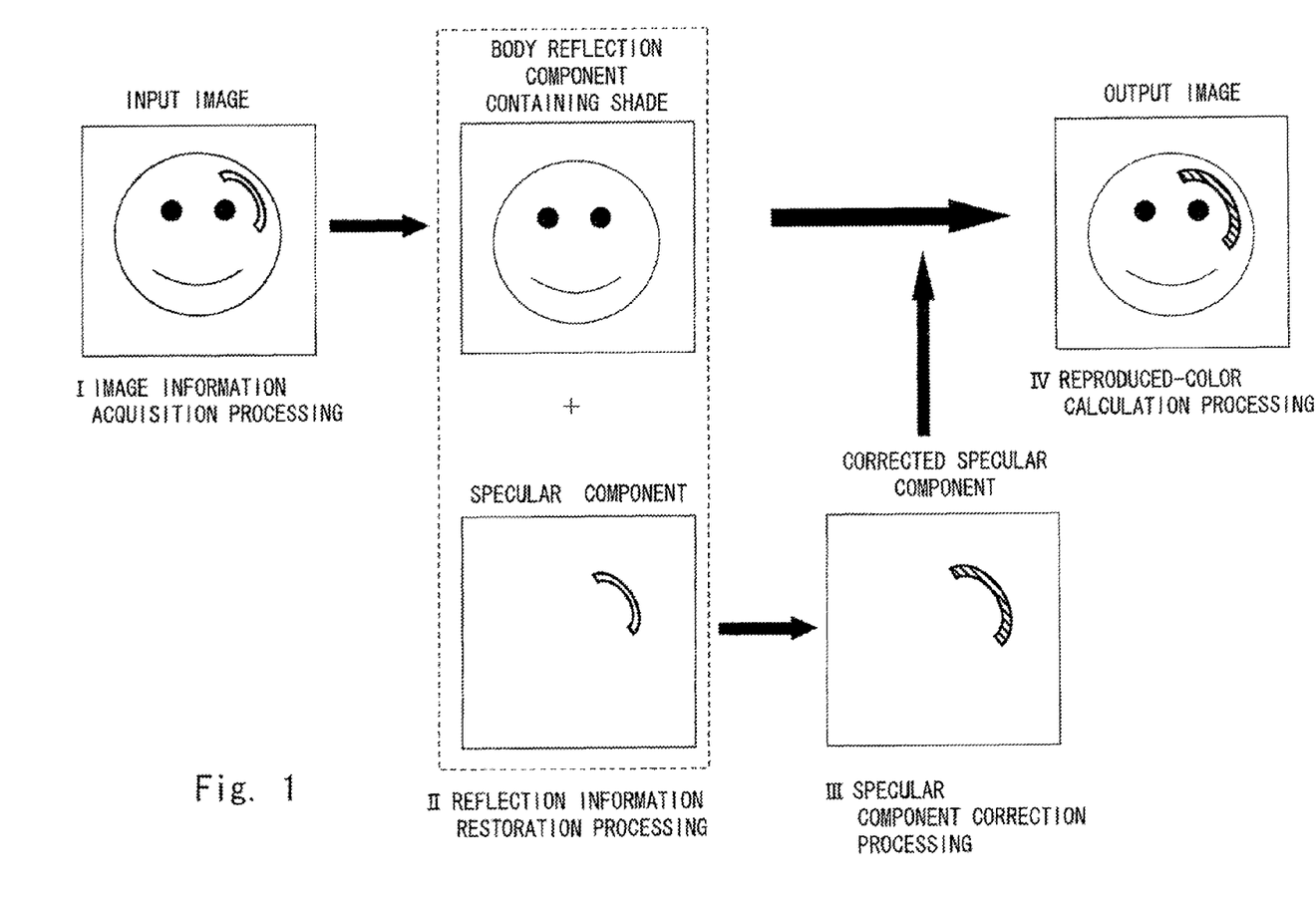
FIG. 1 is a schematic diagram showing a process flow of a color image processing method according to an aspect of an exemplary embodiment of the present invention.

FIG. 1 shows a process flow of a color image processing method according to an exemplary embodiment of the present invention.

I. Firstly, an input image and information about the input image are obtained (image information acquisition process). Specifically, an input image is supplied to a color image processing device and a specific object is specified from the input image. By specifying a specific object, an area in which the specular component is to be corrected (object area) is detected. Further, a 3D shape of the specific object and color information (color of object area) are obtained.

II. Next, reflection information of the specific object is restored (reflection information restoration process). Specifically, geometrical conditions of the lighting are restored based on the 3D shape of the specific object. Next, a specular component and a body reflection component containing shade are restored by using the color information, the 3D shape, and the lighting geometrical conditions. In this process, the specular component is removed from the pixel value of each pixel of the input image and separated from the shade contained in the body reflection component.

III. The specular component is corrected (specular component correction process). The specular component is corrected by using a mean value of the specular component and a reference specular component.

IV. A reproduced color of the specific object is calculated by using the shade contained in the body reflection component and the corrected specular component (reproduced-color calculation process).

In this specification, it is assumed that an object area detected from a specific object is composed of a plurality of pixel. Further, each pixel has color information, and the color information may be also called "pixel value". It is also assumed that the color information contains, at least, shade information, a specular component, and a body reflection component containing shade, and may also contain other color information.

Further, in the following explanation, the specific object and the object area are not differentiated from each other unless otherwise specified.

The body reflection component containing the shade is color information obtained by removing a specular component (glitter) from the original color information of an object area.

The reference specular component is a surface reflectance that is defined in advance according to the specific object.

Figure 2:
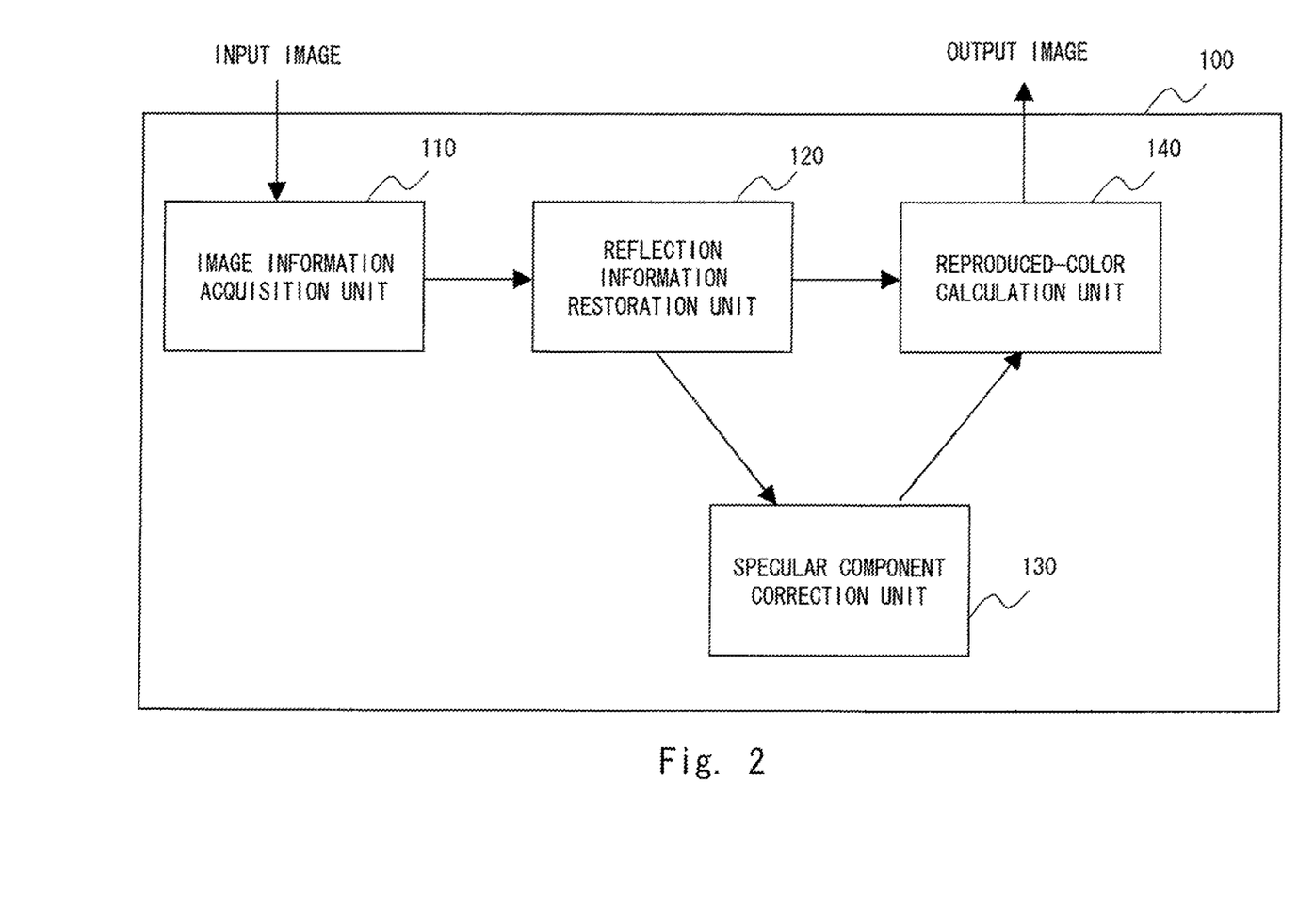
FIG. 2 is a block diagram showing a configuration example of a color image processing device according to an exemplary embodiment of the present invention.

Further, FIG. 2 shows a configuration example of a color image processing device according to an exemplary embodiment of the present invention. A color image processing device 100 includes an image information acquisition unit 110, a reflection information restoration unit 120, a specular component correction unit 130, and a reproduced-color calculation unit 140.

The image information acquisition unit 110 externally receives an input image, specifies a specific object based on the input image, and detects an object area of the specific object. Further, the image information acquisition unit 110 obtains color information and a 3D (three-dimensional) shape of the object area.

The reflection information restoration unit 120 restores a specular component and a body reflection component containing shade of the object area based on the color information and the 3D shape. Specifically, the reflection information restoration unit 120 restores geometrical information of the lighting (irradiance of the lighting) by using the 3D information, and restores a specular component and a body reflection component containing shade by using the color information, the 3D shape, and the lighting geometrical information.

Details of these processes are explained later.

The specular component correction unit 130 corrects the restored specular component. For example, it changes the quantity of the specular component by changing the size of the area) of the specular component and/or the shape of the specular component. As for the correction method, a mean value of the specular component of the object area is calculated, and then a correction is made by using the calculated mean value. For example, a correction is made by comparing the mean value with a predefined arbitrary value. For example, the specular component may be corrected by using a reference specular component as the arbitrary value. Further, a correction value may be entered by a user and a correction may be made by using the entered correction value.

The reproduced-color calculation unit 140 calculates a reproduced color of the object area by using the body reflection component containing shade and the corrected specular component, and generates an output image by using the calculated reproduced color.

As described above, the color image processing device 100 can correct the accurately-restored specular component by using the 3D information of the specific object. Specifically, the image information acquisition unit 110 first obtains 3D information of a specific object. Next, the reflection information restoration unit 120 restores a specular component and a body reflection component containing shade of the specific object with accuracy by using the obtained 3D information of the specific object. Then, the specular component correction unit 130 corrects the accurately-restored specular component.

The reflection information restoration unit 120 can accurately restore the specular component and the body reflection component containing the shade of the specific object by using the color information obtained from the image and the restored lighting geometrical information. In this way, it is possible to suppress the occurrence of unnatural artifacts. In contrast to this, if the 3D information is not used, it is very difficult to restore the specular component and the body reflection component containing the shade with accuracy. Therefore, output images that are generated by correcting specular components and body reflection components containing the shade that are restored without using the 3D information are more susceptible to unnatural artifacts.

The explanations are continued hereinafter with reference to specific exemplary embodiments.

First Exemplary Embodiment

Firstly, a process flow of a color image processing method according to an aspect of the present invention is explained with reference to the drawings. The following explanation is made by using a configuration example of a color image processing device 100 shown in FIG. 2.

Figure 3:
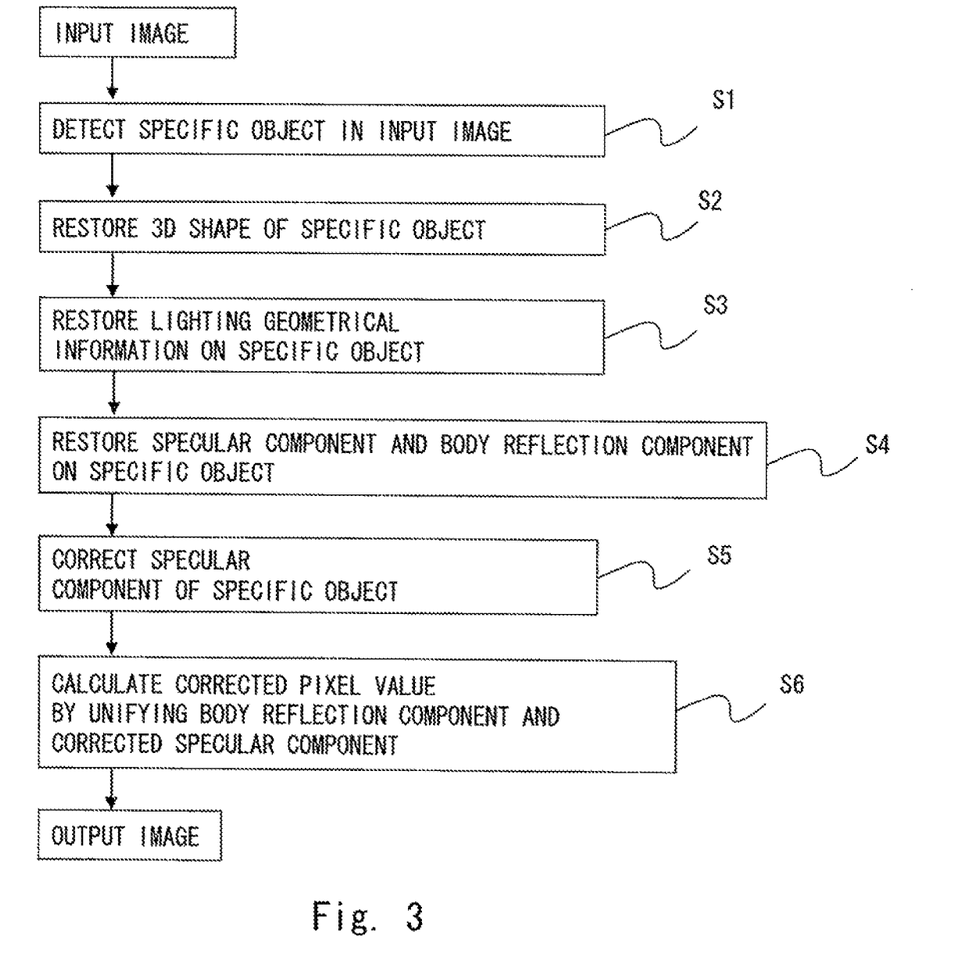
FIG. 3 is a flowchart for explaining a procedure of a first exemplary embodiment of a color image processing method according to the present invention.

FIG. 3 is a flowchart for explaining a color image processing method according to the first exemplary embodiment of the present invention. For the sake of explanation, assume that the color system of the image is an RGB color system. That is, a color of an image is expressed by the combination of R (Red), G (Green) and B (Blue), and represented as "color information RGB". Note that needless to say, the present invention is applicable to color systems other than the RGB color system.

To improve the texture of a specific object in an arbitrarily-given color image in terms of image quality, the reproduced color of each pixel in the object area in the color image is re-calculated.

Note that the specific object is not limited to any particular objects, provided that, even when individuals are different from each other, i.e., even when there are individual differences, the object can be determined as the supposed object based on characteristics obtained from the color image because of the general color information and the universality of the texture.

Firstly, the image information acquisition unit 110 automatically detects a specific object from an input image (step S1). In this process, the image information acquisition unit 110 obtains color information of the object area for the detected specific object.

Figure 4:
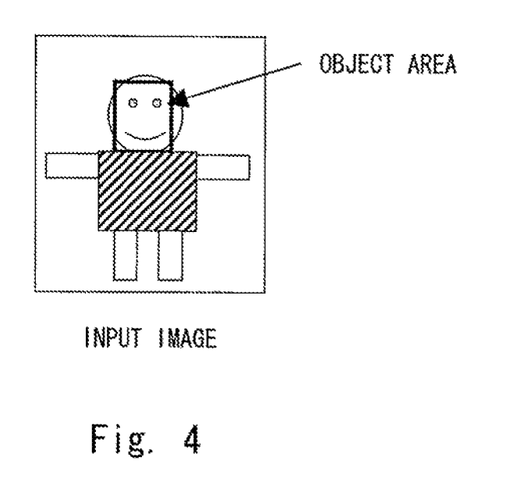
FIG. 4 is a figure for explaining a process to automatically detect an object area in an input image.

As shown in FIG. 4, a specific object is detected from an input color image by using color information, texture, and the like. The following explanation is made on the assumption that the specific object is a human face. When the specific object is a human face, a face area is detected by using features such as an eye(s), a nose, and a mouth.

As a technique for detecting a face area, a face detection method disclosed in Non-patent literature 2, for example, can be used. This technique is a face detection method obtained by combining an Image-based technique with a Feature-based technique for detecting an eye(s), using generalized learning vector quantization.

Further, as a technique for detecting a face area in an input image, a method for detecting an eye(s) in an image disclosed in Patent literature 2 can be used. That is, if the position of an eye(s) is detected from an input image, a face area can be easily estimated.

Note that, in general, the above-mentioned two techniques detect a face by using monochrome information. However, it is possible to improve the accuracy of the face-area detection by incorporating an additional determination whether the detected face area is flesh color (or skin color) or not.

As for the flesh-color determination method, a technique using an image histogram disclosed in Patent literature 1 can be used. The face detection method is not limited to the above-mentioned two techniques, and other techniques may be also used.

Although a case where a face is automatically detected from an arbitrarily-given input image as the object to be detected is described in the above explanation, the object to be detected can be any objects other than faces. Note that, in order to automatically detect an object other than faces, for example, a method for automatically detecting an object by comparing visual characteristic information of the image data with visual characteristic information of a pre-registered object area can be used.

Next, the image information acquisition unit 110 restores a 3D shape of the specific object in the image (step S2). The explanation has been made on the assumption that the specific object is a human face. Therefore, a technique disclosed in the literature mentioned below (hereinafter called "Non-patent literature 3") can be used. In this technique, a 3D shape of a human face is estimated from a 2D (two-dimensional) image by using a face model having average 3D information on the shapes of human faces prepared in advance.

Non-patent literature 3: "Recognition of Non-Frontal Facial Images by Pose Conversion using Generic 3D Face Model" Rui Ishiyama, IEICE, General Conference 2007, D-12-085, 2007, p. 201.

The above-mentioned technique is a 3D shape restoration method specialized in the cases where the specific object is a human face. However, this technique can also restore rough 3D shapes of other specific objects from input images by extending the technique disclosed in Non-patent literature 3 to those specific objects, provided that, even when there are individual differences, the specific objects have a roughly universal shape.

Note that the fact that the 3D shape of the specific object in the input image is restored means that the normal vector $\vec{n}$ at each pixel position in the image is obtained.

The apparent color of a specific object in an input image is affected by the lighting in the scene and its geometrical conditions with respect to the object. That is, when the geometrical conditions of the lighting and the object area are changed, the apparent color of the object area is also changed.

Therefore, next, the geometrical conditions of the lighting with respect to the specific object in the input image are restored (step 3). In the present invention, a simple physical reflection model is applied to represent an actual apparent color. The following three literatures show techniques relating to such physical models (hereinafter called Non-patent literatures 4, 5 and 6 respectively).

Non-patent literature 4: R. Basri and D. Jacobs, "Lambertian Reflectance and Linear Subspaces", Weizmann Institute of Science, Technical Report MCS00-21 NEC Research Institute Technical Report 2000-172R, 2000, pp. 1-27.

Non-patent literature 5: R. Ramamoorthi and P. Hanrahan, "An efficient representation for irradiance environment maps", [online], Proc. ACM SIGGRAPH 01, pp. 497-500, 2001. Searched on Jan. 26, 2009. the Internet <URL: http://www1.cs.columbia.edu/~ravir/papers/envmap/envmap.pdf>

Non-patent literature 6: Ravi Ramamoorthi and Pat Hanrahan: "On the relationship between radiance and irradiance: determining the illumination from images of a convex Lambertian object", J. Opt. Soc. Am. A/Vol. 18, No. 10/October 2001.

According to Non-patent literatures 4 and 5, when cast shadows and proximity lighting are ignored, the apparent irradiance E of the object area is expressed by a function of a normal vector $\vec{n}$ alone, and can be excellently approximated by using spherical surface harmonics. When distant lighting from a direction vector $\vec{\omega}$ is represented as $L(\vec{\omega})$, the irradiance on a perfectly-diffuse hemisphere object $\Omega(\vec{n})$ is expressed as shown below:

$$E(\vec{n}) = \int_{\Omega(\vec{n})} L(\vec{\Omega})(\vec{n}\cdot\vec{\Omega})d\vec{\omega} \tag{1}$$

where $\vec{n}$ and $\vec{\omega}$ are unit direction vectors.

Scaling is performed on the irradiance with a surface albedo $\rho(\vec{p})$ in a position vector $\vec{p}$. Radiosity B corresponding to the luminance in the image is expressed as shown below.

$$B(\vec{p},\vec{n}) = \rho(\vec{p})E(\vec{n}) \tag{2}$$

Assume that lighting conditions are estimated from observed values (irradiance) on a Lambertian surface. As stated above, the lighting is expressed as a non-negative function on the surface of a convex object on the assumption that the influences of cast shadows and proximity lighting can be ignored. In Non-patent literatures 4 and 5, this function is expressed by using spherical surface harmonics.

Spherical surface harmonics $Y_{lm}(l \geq 0, -l \leq m \leq l)$ have a similar figure to a Fourier basis for a straight line or a circle on a spherical surface. Nine spherical surface harmonics ($l \leq 2$) become a constant ($l=0$), a linear expression ($l=1$), or a quadratic polynomial expression ($l=2$) in a Cartesian coordinates (x, y, z), and expressed as shown below.

$$(x, y, z) = (\sin\theta\cos\phi, \sin\theta\sin\phi, \cos\theta) \tag{3}$$

$$Y_{00} = \frac{1}{\sqrt{4\pi}} B(\vec{p},\vec{n}) = \rho(\vec{p})E(\vec{n}) \tag{4}$$

$$(Y_{1-1}, Y_{10}, Y_{11}) = \sqrt{\frac{3}{4\pi}}(y, z, x) \tag{5}$$

$$(Y_{2-2}, Y_{2-1}, Y_{21}) = 3\sqrt{\frac{5}{12\pi}}(xy, yz, xz) \tag{6}$$

$$Y_{20} = \frac{1}{2}\sqrt{\frac{5}{4\pi}}(3z^2 - 1) \tag{7}$$

$$Y_{22} = \frac{3}{2}\sqrt{\frac{5}{12\pi}}(x^2 - y^2)$$

$L(\vec{n})$ and $E(\vec{n})$ are expressed by coefficients $L_{lm}$ and $E_{lm}$ in a spherical surface harmonic expansion.

$$L(\vec{n}) = \sum_{l=0}^{\infty} \sum_{m=-l}^{l} L_{lm} Y_{lm}(\vec{n}) \tag{8}$$

$$E(\vec{n}) = \sum_{l=0}^{\infty} \sum_{m=-l}^{l} E_{lm} Y_{lm}(\vec{n}) \tag{9}$$

$A = \vec{n}\cdot\vec{\omega}$ is represented by $A_l$. Since A does not depend on the azimuth angle, only m=0 and an index l are used.

$$A(\vec{n}) = \max[\cos\theta, 0] = \sum_{l=0}^{\infty} A_l Y_{l0}(\vec{n}) \tag{10}$$

Then, from these definitions, as shown in Non-patent literature 6, $E_{lm}$ is expressed as shown below.

$$E_{lm} = \sqrt{\frac{4\pi}{2l+1}} A_l L_{lm} \tag{11}$$

Here, a variable $\hat{A}_l$ is used as shown below.

$$\hat{A}_l = \sqrt{\frac{4\pi}{2l+1}} A_l \tag{12}$$

For the rendering, the irradiance E is expressed as shown below.

$$E(\theta, \phi) = \sum_{l=0}^{\infty} \sum_{m=-l}^{l} \hat{A}_l L_{lm} Y_{lm}(\vec{n}) \tag{13}$$

Note that an analysis formula for $\hat{A}_l$ can be derived from Non-patent literature 6. $\hat{A}_l$ disappears when l is an odd number greater than one (l>1), and drops sharply as $l^{-5/2}$ when l is an even number. when l=1, $$\hat{A}_1 = \frac{2\pi}{3} \tag{14}$$

when l is an odd number greater than one (l>1), $$\hat{A}_l = 0 \tag{15}$$

when l is an even number, $$A_l = 2\pi \frac{(-1)^{\frac{l}{2}-1}}{(l+2)(l-1)} \left[ \frac{l!}{2^l \left(\frac{l}{2}!\right)^2} \right] \tag{16}$$

When expressed by numerical values, they have following values. $\hat{A}_{0=3.141593}$, $\hat{A}_{1=2.094395}$, $\hat{A}_{2=0.785398}$, $\hat{A}_{3=0}$ $\hat{A}_{4=-0.130900}$, $\hat{A}_{5=0}$, $\hat{A}_{6=0.049087}$ As described above, an irradiance E in each pixel of the specific object expressed by Expression (13) is obtained. That is, it means that the lighting geometrical conditions with respect to the specific object in the input image can be restored. Note that the irradiance E is regarded as the geometrical conditions.

Next, the reflection information restoration unit 120 restores (calculates) a specular component and a body reflection component containing shade in the specific object in the input image (step S4).

In general, the reflectance of an object area depends on the geometrical conditions of incident light and emitted light. In general, this reflection characteristic is expressed as a BRDF (Bidirectional Reflectance Distribution Function). A BRDF is often composed of two components of a specular component and a body reflection component containing shade. In FIG. 1, a state in which an object area in an input image is separated into a specular component and a body reflection component is shown in (a) image information acquisition process and (b) reflection information restoration process.

When the specific object is a living creature such as a human, the specular component and the body reflection component are defined as described below.

The specular component is a component that is reflected on the skin surface.

The reflection body component is a component of light that is generated when light temporarily enters inside the skin, and is scattered inside the skin and dispersed again through the skin.

By assuming that the surface reflection characteristic of the specific object is Lambertian, i.e., perfect diffusion, an irradiance in each pixel of the specific object is calculated by using spherical surface harmonics as shown in the step S4. Since the perfect diffusion is assumed, this irradiance E can be regarded as a diffuse reflection component (or body reflection component) DR (Diffuse Reflection) of the specific object. The irradiance E is assumed to be calculated for each color channel (e.g., R, G and B). Therefore, it is represented as "Ei". The letter "i" indicates each color channel. Similarly, the diffuse reflection component (or the body reflection component) is represented as "DRi".

$$Ei=DRi \qquad (17)$$

The diffuse reflection component (or the body reflection component) is calculated on the assumption that the specific object is Lambertian. However, in practice, it contains the specular component rather than the diffuse reflection component (or the body reflection component). In other words, the pixel value of each color channel in an input image represents apparent brightness in that color channel containing a diffuse reflection component (or a body reflection component) and a specular component. The diffuse reflection component (or the body reflection component) is calculated by using a least squares method or the like in the object area, and therefore the irradiance does not necessarily match the pixel value. It can be safely said that the difference occurring in this discrepancy is the specular component. Therefore, a specular component SPi for each color channel of a certain pixel in the specific object area is calculated by using the following expressions.

when $SPi=Ii-Dri, Ii-DRi>0$ when $SPi=0$, other than that above $\qquad (18)$

Note that "Ii" represents the pixel value of a certain pixel in the specific object area in the input image, and "i" represents a color channel (e.g., R, G, B or the like).

The body reflection component BRi of a certain pixel in the specific object area in the input image is obtained by subtracting the specular component SPi from the pixel value Ii of the image:

$$BRi=Ii-Spi=Min(Ii,DRi) \qquad (19)$$

where Min(x, y) is a function that outputs the smallest value between x and y.

With the processes described above, the specular component and the body reflection component are calculated with higher accuracy by using the 3D information of the specific object in the input image.

Next, the specular component is corrected (step S5). When the specular component occurring in the specific object area in the input image is obtained, the texture of the specific object is improved by controlling the quantity (size and strength) of this specular component. That is, a desired specular component is generated by controlling/adjusting the quantity of the original specular component, such as the magnitude of the size and the strength of the specular component, in the specific object in the input color image.

A predefined desired quantity (strength) of a specular component in an object area is represented as $\overline{SPref}_i$. Note that i indicates a color channel such as R, G and B. This $\overline{SPref}_i$ can be calculated in the following manner. Firstly, a reference image in which the texture of a specific object is excellent is prepared in advance. By applying the above-described steps S1 to S4, a specular component SPi obtained by Expression (18) for the specific object having an excellent texture is calculated. The specular component SPi is a pixel value of each pixel in the specific object area. Therefore, a mean value of the specular components SPi in that object area is calculated and the obtained mean value is represented as $\overline{SPref}_i$. Similarly, a mean value of the specular components SPi in the specific object area in the input image is calculated and the obtained mean value is represented as $\overline{SP}_i$.

$$\alpha i = \overline{SPref}_i / \overline{SP}_i \qquad (20)$$

Then, the quantity (strength) of the specular component is corrected to a desired quantity by multiplying the specular component SPi in the object area in the input image by a correction coefficient αi obtained by Expression (20).

$$SPi' = \alpha i \times SPi \qquad (21)$$

As for the correction of the quantity (size) of the specular component, the quantity (size) of the specular component of the specific object in the input image is adjusted by using a predefined desired quantity (size) of the specular component of the object area as in the case of the adjustment of the strength. Note that the ratio of the number of pixels of the specular component to the number of pixels of the specific object area may be used as the size of the specular component.

When the size is to be reduced, the value of αi in Expression (21) is adjusted so that the number of pixels, i.e., the size of the specular component in the specific object area in the input image gets closer to a desired quantity (size) of the specular component of the object area. Specifically, the strength of the specular component is restrained, and when the pixel value SPi becomes smaller than a certain threshold, it may set to zero.

On the other hand, when the size is to be increased, it is necessary to take a certain measure. This is because pixels that are not originally the specular component never become the specular component according to Expression (18). When the size is to be increased, a pixel that is not originally the specular component and is located adjacent to a pixel that is originally the specular component is selected in a random fashion and a positive real number is added to the pixel value SPi of that pixel while adjusting αi in Expression (21). The process in which a pixel that is located adjacent to a pixel that is originally the specular component is selected in a random fashion and a positive real number is added to the pixel value of that pixel while adjusting αi in Expression (21) is repeated until the desired size is achieved.

Next, a corrected color of each pixel in the object in the input image is calculated by using the corrected specular component and the body reflection component (step S6).

A color-corrected pixel value Ii' is calculated by adding the corrected specular component SPi' obtained in the step S5 to the body reflection component BRi.

$$Ii'=Bri+Spi' \qquad (22)$$

An image that is obtained by correcting the color of the object area in the input image is output as an output image.

Although a case where the device-dependent colors of the input and output images are RGB is explained in the above explanation, the present invention can be also applied to images of device-dependent colors other than RGB such as CMY and CMYK, provided that the corresponding relation between those device-dependent colors and the tristimulus values XYZ of device-independent colors can be obtained. Not that "device-dependent colors" mean a color space that depends on the device to which the image is output.

Figure 5:
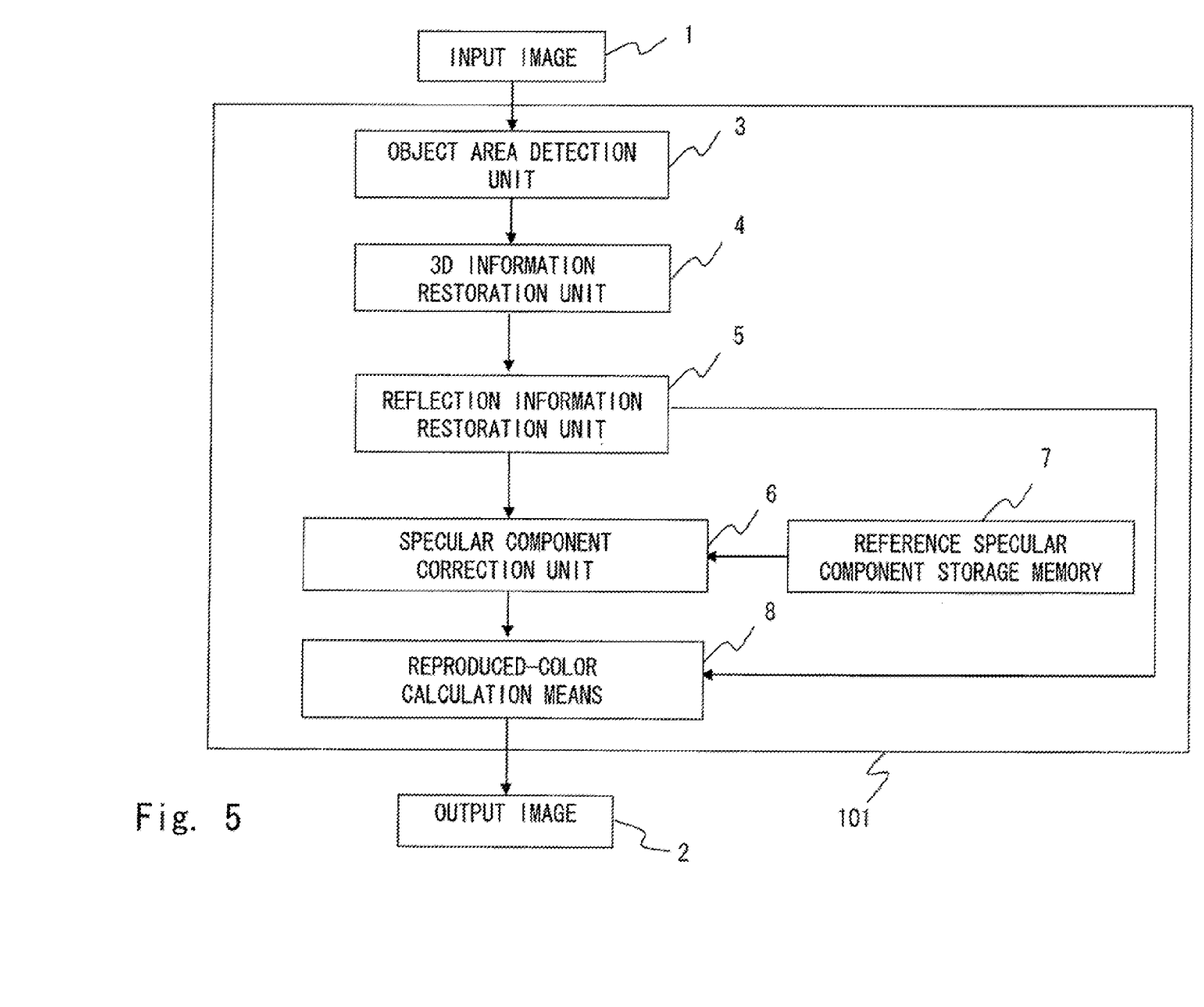
FIG. 5 is a block diagram showing a configuration example of a color image processing device according to a first exemplary embodiment.

Next, a color image processing device (color correction device) to which the color image processing method according to the first exemplary embodiment of the present invention is applied is explained. FIG. 5 shows a configuration example of a color image processing device according to a first exemplary embodiment of the present invention.

A color image processing device 101 is a device that corrects the specular component of an object area in an input image 1 and thereby outputs an output image 2. The color image processing device 101 includes an object area detection unit 3, a 3D information restoration unit (object area 3D information restoration unit) 4, a reflection information restoration unit (unit for restoring a specular component and a body reflection component of an object area) 5, a specular component correction unit 6, a reference specular component storage memory 7, and a reproduced-color calculation unit (object area reproduced-color calculation unit) 8.

When an input image 1 is supplied, the object area detection unit 3 analyzes the input image 1, detects a pre-assumed specific object, and outputs information indicating an object area for the detected specific object. The information indicating the object area contains color information of the object area.

Note that the object to be detected from the input image 1 is such an object that the color and the shape feature of its object area can be limited to some extent like a human face as described above. As for the detection method, the above-described technique may be used. Note that if no object to be processed is detected from the input image 1, the input image 1 itself is output as an output image 2.

The 3D information restoration unit 4 restores a 3D shape of the object area detected by the object area detection unit 3. The 3D information restoration unit 4 performs a process corresponding to the step S2 in FIG. 3.

The reflection information restoration unit 5 restores (calculates) an irradiance E in the object area by using the 3D shape (i.e., normal vector) of the object area in accordance with the step S3, in FIG. 3. The 3D shape of the object area is calculated by the 3D information restoration unit 4.

Further, it restores (calculates) the specular component and the body reflection component in the object area according to the process method described in the step S4 in FIG. 3.

The specular component correction unit 6 corrects the calculated specular component in the object area to a desired quantity by using a reference specular component. The reference specular component is a specular component with which a desirable image of the object area is achieved, and is defined in advance according to the object area. The specular component correction unit 6 performs a process corresponding to the above-described step S5 in FIG. 3. The specular component correction unit 6 enables the color of an object having complex reflection characteristics such as a human skin to be reproduced with high accuracy. Further, it can prevent the occurrence of artifacts.

The reference specular component storage memory 7 stores a reference specular component(s).

The reproduced-color calculation unit 8 calculates a corrected color of each pixel in the object area by using the corrected specular component and the body reflection component containing the shade, and outputs the color-corrected image as an output image. The corrected specular component is a component corrected by the specular component correction unit 6, and indicates a desirable specular component of each pixel in the object area. The body reflection component containing the shade is a component calculated by the reflection information restoration unit 5. The reproduced-color calculation unit 8 performs a process corresponding to the step S6 in FIG. 3.

As described above, the color image processing device 101 provides, as a method for realizing desirable image quality of a human face, a method for improving image quality by adjusting the unpleasant specular reflection component (specular component, i.e., glitter). Specifically, the specular component correction unit 6 corrects the specular component, and the reproduced-color calculation unit 8 generates an output image by using the corrected specular component. That is, the color image processing device 101 can correct the image quality of an object to desirable image quality by using the specular component correction unit 6 and the reproduced-color calculation unit 8. In contrast to this, a method of changing the color of an artificial object such as plastic having a dichromatic reflection model from red to blue has been provided in the related art. For the artificial object like this, it is very difficult to improve the image quality and thereby achieve desirable image quality by correcting the color.

Further, the color image processing device 101 according to the first exemplary embodiment and the color image processing device 100 shown in FIG. 2 are related to each other in the following manner.

The image information acquisition unit 110 is composed of the object area detection unit 3 and the 3D information restoration unit 4.

The reflection information restoration unit 120 corresponds to the reflection information restoration unit 5.

The specular component correction unit 130 is composed of the specular component correction unit 6 and the reference specular component storage memory 7.

The reproduced-color calculation unit 140 corresponds to the reproduced-color calculation unit 8.

Note that the configuration of the color image processing device shown in FIG. 2 or 5 is merely an example, and any other device configurations capable of realizing similar functions may be also used.

Further, the color image processing device 101 can be implemented by using a computer, and each of the components constituting the color image processing device, i.e., the object area detection unit 3, the 3D information restoration unit 4, the reflection information restoration unit 5, the specular component correction unit 6, the reference specular component storage memory 7, and the reproduced-color calculation unit 8 can be implemented as a program(s) that causes the central processing unit (CPU) of a computer to implement the above-described functions. The fact that each component constituting the color image processing device can be implement by a computer and can be implemented as a program(s) is not limited to the first exemplary embodiment, and also holds true in other exemplary embodiments.

Second Exemplary Embodiment

Figure 6:
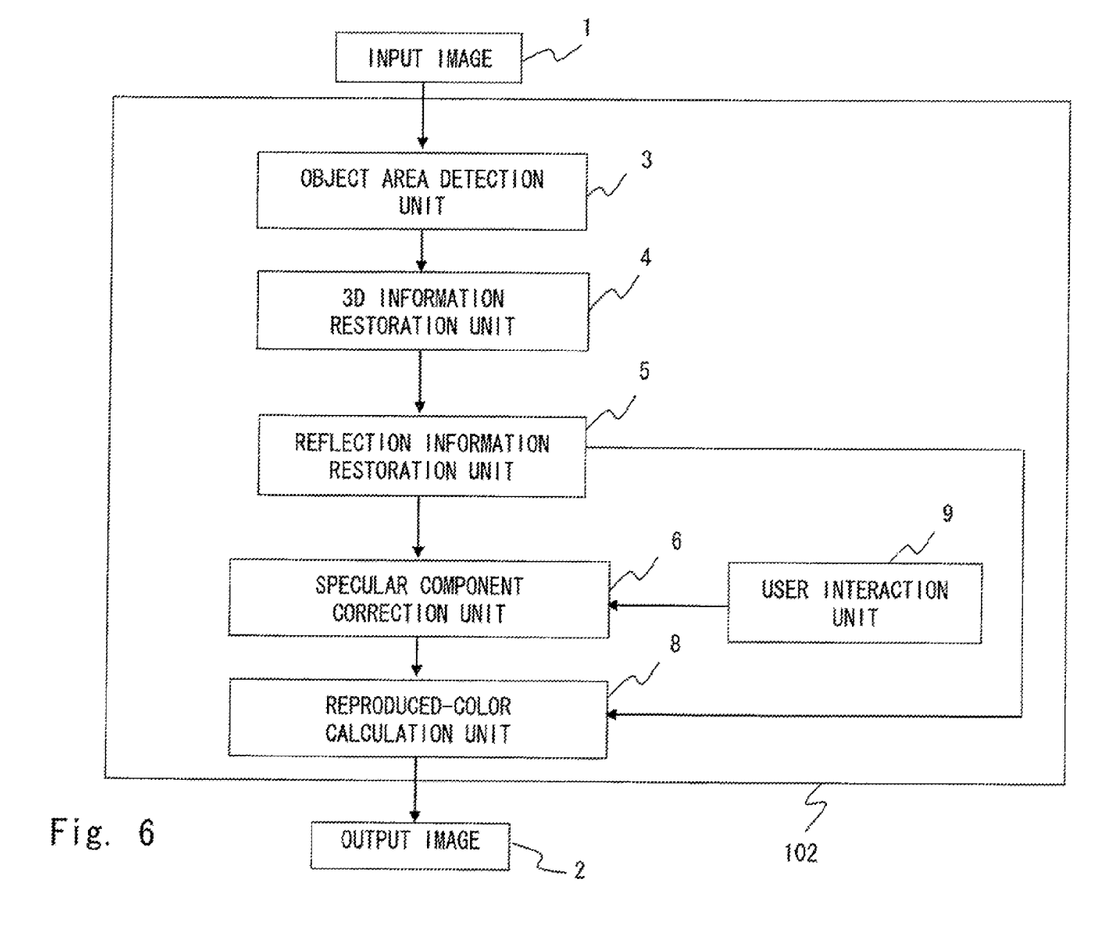
FIG. 6 is a block diagram showing a configuration example of a color image processing device according to a second exemplary embodiment.

Next, a color image processing device according to a second exemplary embodiment of the present invention is explained. FIG. 6 shows a configuration example of a color image processing device according to a second exemplary embodiment of the present invention. A color image processing device 102 is a device that corrects the specular component of an object area in an input image 1 and thereby outputs an output image 2.

The color image processing device 102 includes the object area detection unit 3, the 3D information restoration unit 4, the reflection information restoration unit 5, the specular component correction unit 6, a user interaction unit 9, and thus reproduced-color calculation unit 8.

The color image processing device 102 is obtained by replacing the reference specular component storage memory 7 of the color image processing device 101 by the user interaction unit 9. Therefore, only the user interaction unit 9 is explained.

Figure 7A:
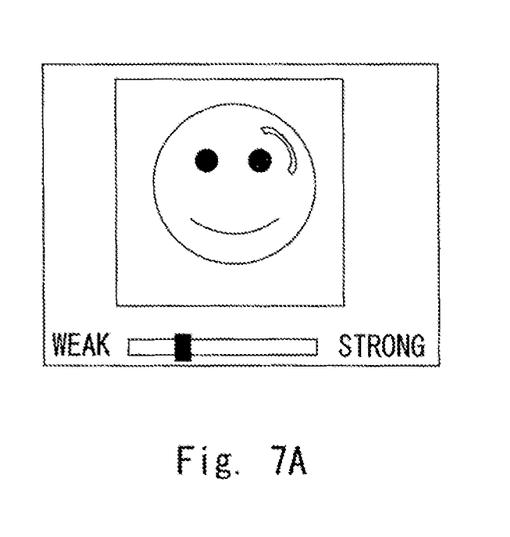
FIG. 7A is a figure showing an example of user interaction means for adjusting a specular component of a specific object area in an input image (when the quantity of the specular component is to be reduced)
Figure 7B:
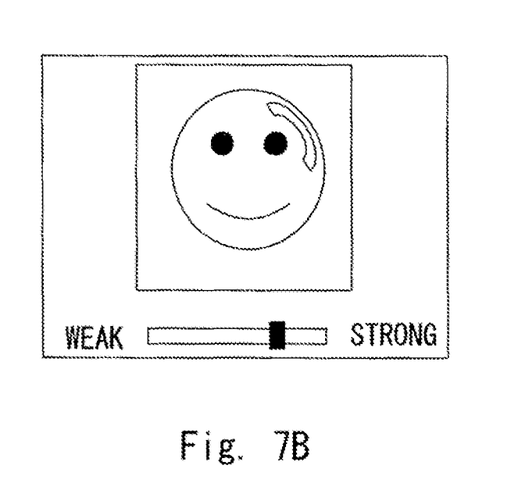
FIG. 7B is a figure showing an example of user interaction means for adjusting a specular component of a specific object area in an input image (when the quantity of the specular component is to be increased).

The user interaction unit 9 provides interaction means that enables a user to adjust the quantity of the specular component in a specific object area in an input image. FIGS. 7A and 7B show an example of the user interaction means. In the reflection information restoration unit 5, a graphical user interface (GUI) through which the calculated quantity of the specular component of a specific object area in an input image can be adjusted in an interactive fashion is provided. A slider-bar of this GUI can be used to adjust, for example, the value of α in Expression (21). FIG. 7A shows an example in which the specular component is weakened, while FIG. 7B shows an example in which it is strengthened. The user interaction unit 9 displays a corrected image on which the adjustment result of the specular component in the input image is reflected in real time.

The user interaction unit 9 receives a quantity (correction value) of a specular component entered by a user, and notifies the received quantity to the specular component correction unit 6. The correction value may be a value indicating the total quantity of the specular component, or a value indicating a quantity by which the current specular component is to be changed.

The specular component correction unit 6 corrects the specular component of each pixel by using the notified quantity for the specular component.

In this way, an output image desired by a user can be generated.

Further, although a configuration example in which the reference specular component storage memory 7 is replaced by the user interaction unit 9 is explained above with reference to FIG. 6, both components may be provided at the same time.

For example, an image in which a specular component is corrected by using the reference specular component storage memory 7 is displayed for a user. When the user desires to change the specular component for the corrected image even further, he/she can enter a correction value. In this way, an output image desired by the user can be generated. Further, the user can change the specular component according to the particular use.

Other Exemplary Embodiments

The color image processing method and device in each of the above-described exemplary embodiments can be implemented by using a computer. Each process of the color image processing method and device can be also implemented by combining two or more of software, hardware, and firmware.

For example, when the color image processing device 100 shown in FIG. 2 is implemented by using a program(s), the program (a group of commands) causes a computer to execute at least the following procedures. The program is loaded into a memory of the computer, and each command is executed under the control of the CPU.

(a) An image information acquisition procedure for receiving an input image, detecting an object area based on the input image, and obtaining color information and 3D information of the object area. This procedure corresponds to the image information acquisition unit 110 in FIG. 2. (b) A reflection information restoration procedure for restoring a specular component and a body reflection component containing shade of the object area based on the color information and the 3D information. This procedure corresponds to the reflection information restoration unit 120 in FIG. 2. (c) A specular component correction procedure for correcting the specular component. This procedure corresponds to the specular component correction unit 130 in FIG. 2. (d) A reproduced-color calculation procedure for calculating a reproduced color of the object area by using the body reflection component containing the shade and the corrected specular component, and thereby generating an output image. This procedure corresponds to the reproduced-color calculation unit 140 in FIG. 2.

Specifically, in the specular component correction procedure, a mean value of the specular component of the object area may be calculated and the spectral power distribution of the lighting may be restored by using the calculated mean value. Further, the mean value of the specular component may be corrected by using reference specular component information that is defined in advance for the object area.

Further, the specular component correction procedure may include a user interaction procedure for receiving a correction value for the specular component from a user, and the mean value of the specular component may be corrected by using the received correction value.

The program can be provided by recording it in a recording medium, or can be provided by transmitting it through the Internet or other communication media. Note that examples of the storage media include a flexible disk, a hard disk, a magnetic disk, magneto-optic disk, a CD-ROM, a DVD, a ROM cartridge, a RAM memory cartridge with a battery backup, a flash memory cartridge, and a nonvolatile RAM cartridge. Further, examples of the communication media include a wire communication medium such as a telephone line, a radio communication medium such as a microwave line.

As has been explained so far, according to an aspect of an exemplary embodiment in accordance with the present invention, for a specific object in a color image taken by a color imaging device, it is possible to improve the texture by controlling the quantity of the specular component in the specific object.

According to an aspect of an exemplary embodiment of the present invention, it is possible to solve the problem that the texture of an object could deteriorate in the related-art color correction method, and to achieve a desired texture of an object area of a specific object in a color image taken by a color imaging device by controlling the specular component of the specific object. Further, since the present invention does not require the use of a special measurement device such as a fiber-optic spectrometer, it is possible to realize an easier technique using only an input image.

Although the present invention is explained with reference to exemplary embodiments in the above explanation, the present invention is not limited to the above-described exemplary embodiments. Various modifications that can be easily understood by those skilled in the art can be made to the configurations and the details of the present invention without departing from the scope of the present invention.

INDUSTRIAL APPLICABILITY

The present invention is applicable to functions of improving the image quality of color image input/output devices. Further, the present invention is also applicable as image-correcting software or utility for given color images by applying the present invention in the form of a program running on a computer system.

| Reference Signs List | |
|---|---|
| 1 | INPUT IMAGE |
| 2 | OUTPUT IMAGE |
| 3 | OBJECT AREA DETECTION UNIT |
| 4 | 3D INFORMATION RESTORATION UNIT |
| 5 | REFLECTION INFORMATION RESTORATION UNIT |
| 6 | SPECULAR COMPONENT CORRECTION UNIT |
| 7 | REFERENCE SPECULAR COMPONENT STORAGE MEMORY |
| 8 | REPRODUCED-COLOR CALCULATION UNIT |
| 100, 101, 102 | COLOR IMAGE PROCESSING DEVICE |
| 110 | IMAGE INFORMATION ACQUISITION UNIT |
| 120 | REFLECTION INFORMATION RESTORATION UNIT |
| 130 | SPECULAR COMPONENT CORRECTION UNIT |
| 140 | REPRODUCED-COLOR CALCULATION UNIT |

The invention claimed is:

1. A color image processing method comprising:
   detecting an object area based on an input image;
   obtaining color information and 3D information of the object area;
   restoring a specular component and a body reflection component containing shade of the object area based on the color information and the 3D information;
   calculating a mean value of the specular component of the object area, and correcting the specular component by using the calculated mean value; and
   calculating a reproduced color of the object area by using the body reflection component containing the shade and the corrected specular component, and thereby generating an output image.

2. The color image processing method according to claim 1, wherein in the correction of the specular component, a mean value of the specular component is corrected by using a reference specular component that is defined in advance for the object area.

3. The color image processing method according to claim 1, wherein in the correction of the specular component, a correction value for the specular component is received from a user, and a mean value of the specular component is corrected by using the received correction value.

4. A color image processing device comprising:
   an image information acquisition unit that detects an object area based on an input image, and obtains color information and 3D information of the object area;
   a reflection information restoration unit that restores a specular component and a body reflection component containing shade of the object area based on the color information and the 3D information;
   a specular component correction unit that calculates a mean value of the specular component of the object area, and corrects the specular component by using the calculated mean value; and
   a reproduced-color calculation unit that calculates a reproduced color of the object area by using the body reflection component containing the shade and the corrected specular component, and thereby generates an output image.

5. A color image processing device according to claim 4, further comprising a reference specular component storage memory that stores a reference specular component defined in advance for the object area,
   wherein the specular component correction unit corrects a mean value of the specular component by using the reference specular component.

6. A color image processing device according to claim 4, further comprising a user interaction unit that receives a correction value for the specular component from a user,
   wherein the specular component correction unit corrects a mean value of the specular component by using a received correction value.

7. A non-transitory computer-readable recording medium storing a color image processing program that causes a computer to execute:
   an image information acquisition procedure for detecting an object area based on an input image, and obtaining color information and 3D information of the object area;
   a reflection information restoration procedure for restoring a specular component and a body reflection component containing shade of the object area based on the color information and the 3D information;
   a specular component correction procedure for calculating a mean value of the specular component of the object area, and correcting the specular component by using the calculated mean value; and
   a reproduced-color calculation procedure for calculating a reproduced color of the object area by using the body reflection component containing the shade and the corrected specular component, and thereby generating an output image.

8. The non-transitory computer-readable recording medium storing a color image processing program according to claim 7, wherein in the specular component correction procedure, a mean value of the specular component is corrected by using a reference specular component that is defined in advance for the object area.

9. The non-transitory computer-readable recording medium storing a color image processing program according to claim 7, further comprising a user interaction procedure for receiving a correction value for the specular component from a user,
   wherein in the specular component correction procedure, a mean value of the specular component is corrected by using a received correction value.

* * * * *